United States Patent [19]
Yamada et al.

[11] Patent Number: 4,504,223
[45] Date of Patent: Mar. 12, 1985

[54] SOLDERING DEVICE FOR RADIATOR TANKS

[75] Inventors: Kazuo Yamada, Aichi; Hiroshi Sakaki, Hon, both of Japan

[73] Assignee: Ryowa Engineering Company, Limited, Nagoya, Japan

[21] Appl. No.: 524,757

[22] Filed: Aug. 18, 1983

[51] Int. Cl.³ .............................................. F27B 9/22
[52] U.S. Cl. ................................. 432/225; 432/226; 432/231; 238/19; 238/46
[58] Field of Search ............... 432/225, 226, 230, 231, 432/233, 5; 238/19, 46

[56] References Cited

U.S. PATENT DOCUMENTS

| | | | |
|---|---|---|---|
| 1,886,838 | 11/1932 | Rowland | 432/231 |
| 2,743,692 | 5/1956 | Wietzel et al. | 432/226 |
| 2,812,933 | 11/1957 | Harris | 432/231 |
| 2,837,126 | 6/1958 | Hughes et al. | 432/231 |
| 3,930,606 | 1/1976 | Dewdney | 432/226 |
| 4,102,638 | 7/1978 | Tiegel | 432/230 |
| 4,371,106 | 2/1983 | Chapman | 432/231 |
| 4,444,558 | 4/1984 | Kinto | 432/225 |

Primary Examiner—Henry C. Yuen
Attorney, Agent, or Firm—Keiichi Nishimura

[57] ABSTRACT

A soldering device for radiator tanks comprises a large number of burner nozzles disposed along the entire width of and directed to the soldering area. Cooling pipes are provided on burner tables which can be adjusted so that the radiator can be inserted inside the gap formed therebetween. A control means shifts the times for starting and shutting off the supplying of an oxygen-containing gas from the burner ignition and fire extinction times.

3 Claims, 6 Drawing Figures

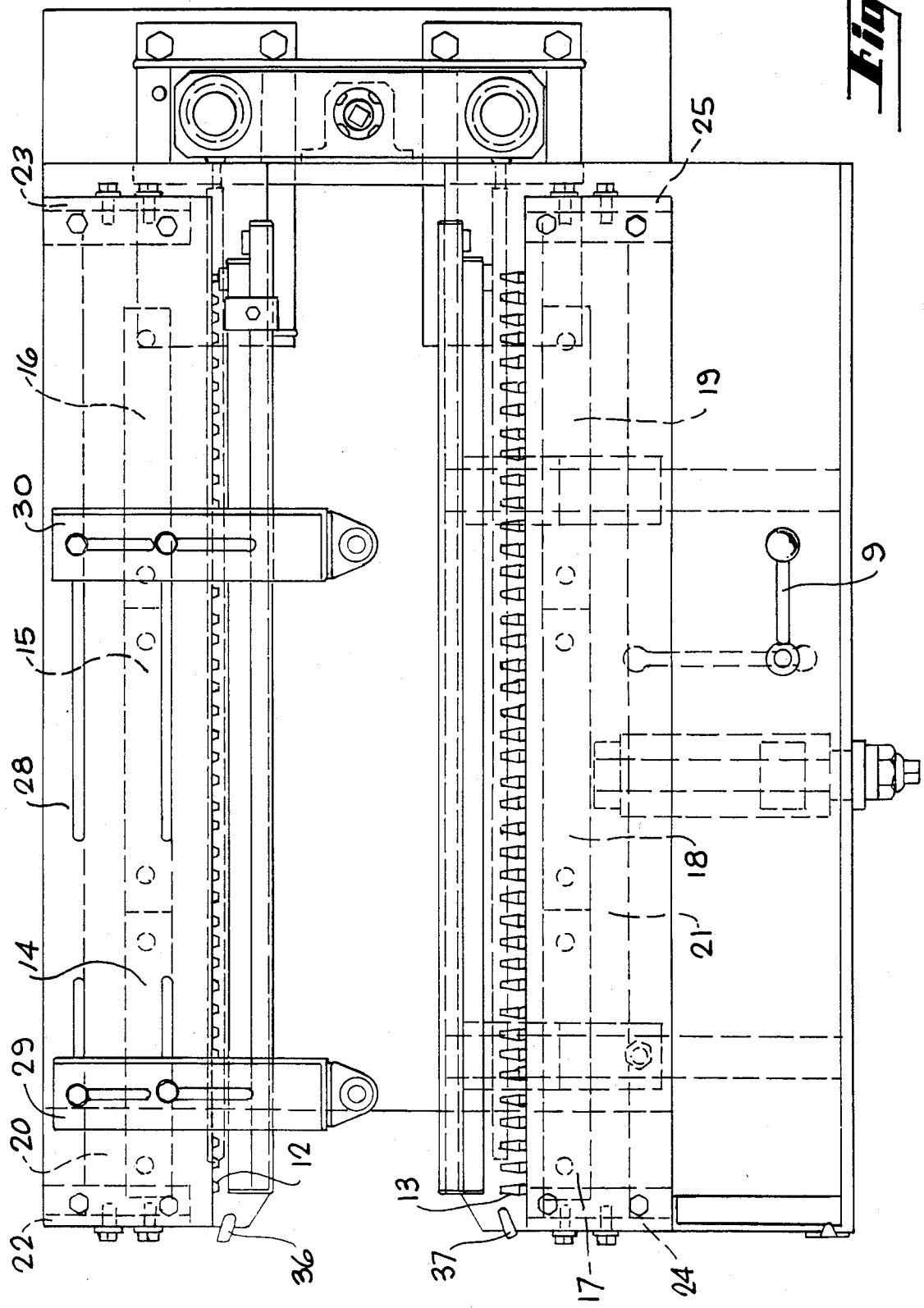

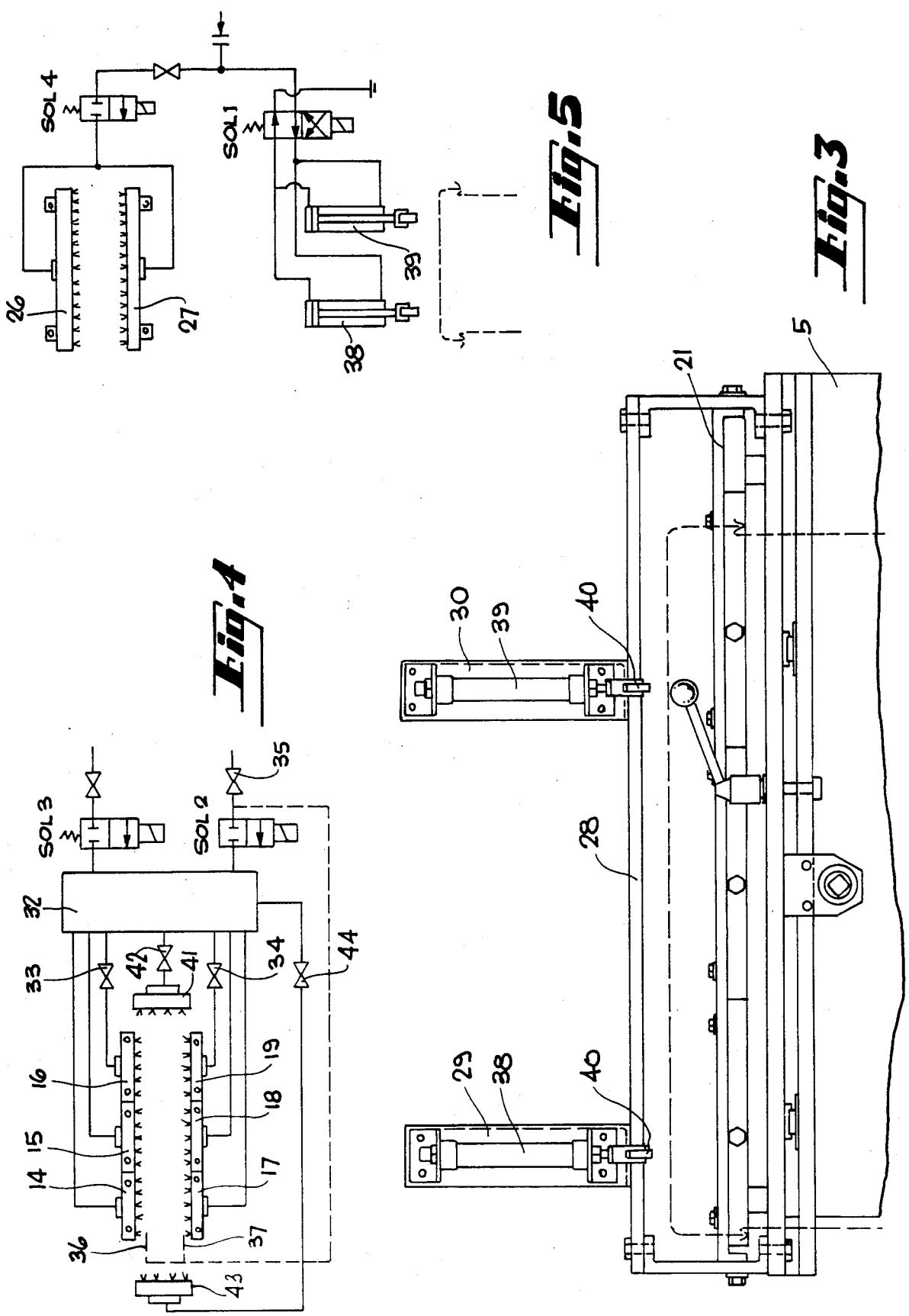

SOLDERING DEVICE FOR RADIATOR TANKS

BACKGROUND OF THE INVENTION

This invention relates to a device for soldering the upper and lower tanks of a radiator for an automobile or an air-conditioner.

According to the conventional method of repairing an automobile radiator, a burner is moved around the soldering area from one place to another to melt the solder for soldering the radiator core plate and the tanks. With the recent increase in the number of automobiles throughout the world, the frequency of automobile accidents has also increased while the conventional repair method described above has the problem not only of being time-consuming but also of being costly.

SUMMARY OF THE INVENTION

It is therefore an object of this invention to provide an efficient soldering device for radiator tanks capable of yielding high-quality products.

This and other objects of the present invention are achieved by providing a soldering device comprising cooling pipes disposed on burner tables which can be so adjusted that the radiator to be worked on can be inserted inside the gap therebetween, a plurality of burner nozzles along the entire width of the soldering area and a control means for shifting the times of starting and shutting off the supplying of an oxygen-containing gas mixture from the burner ignition and fire extinction times. The cooling pipes are in contact with the soldering area and prevents heat transmission into the core section of the radiator.

BRIEF DESCRIPTION OF THE DRAWINGS

FIG. 2 is a plan view of the device of FIG. 1.
FIG. 3 is a side view of one of the burner tables.
FIG. 4 is a burner piping diagram.
FIG. 5 is a piping diagram for the cover holder and the air cooler.

DETAILED DESCRIPTION OF THE INVENTION

Figure 1:
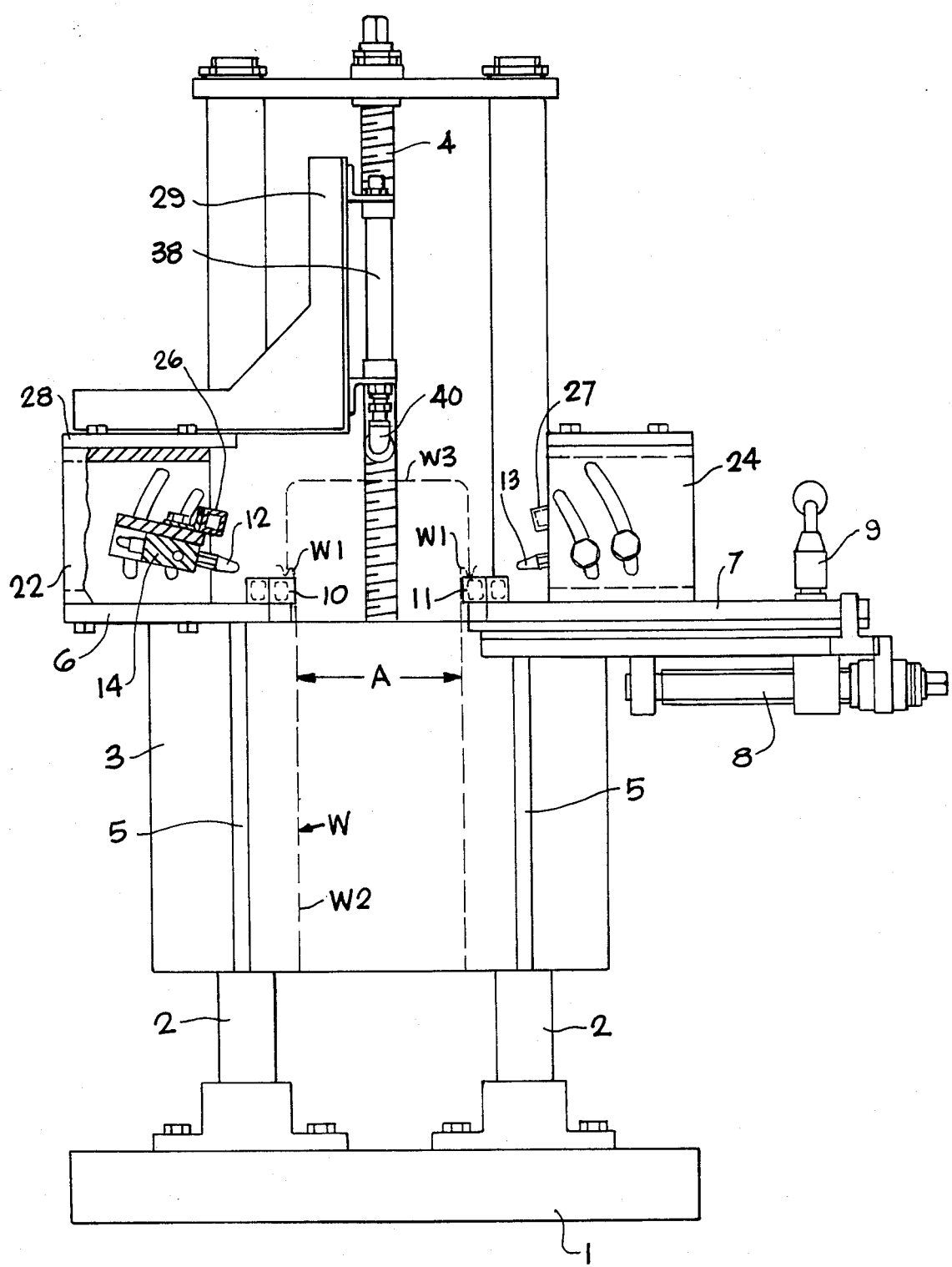
FIG. 1 is a frontal view of a soldering device of the present invention.

Referring now to FIGS. 1, 2 and 3, there is shown a vertically slidable frame 3 which is attached to two stands 2 fastened on a base 1. The vertical position of the frame 3 is adjusted to the height of the radiator W by means of a screw 4 and there are two arms affixed thereto at an interval and extending onto the base 1. Set on these arms 5 respectively are two burner tables 6 and 7 so as to form a single horizontal plane and separated by a gap A into which the radiator W is to be inserted. At least one of the burner tables 7 is made movable by a screw 8 so that the gap A can be adjusted appropriately to the thickness of the radiator W and the burner table 7 can be fastened by means of a clamp handle 9. U-shaped parallel pipes 10 and 11 having square cross sections for circulating cooling water are affixed respectively onto the burner tables 6 and 7, sandwiching the gap A therebetween. They are also designed to serve as frames for holding up the "jaw section" W1 of the soldering area of the core plate for the radiator W which is inserted into the gap A. Both the lower section and the root section of the jaw W1 are cooled by the cooling water so as to prevent heat from traveling to the radiator core section W2 and to protect the soldering of the core cooling pipes. Behind the cooling pipes 10 and 11 on the burner tables 6 and 7, there are burner nozzles 12 and 13 pointing to the radiator W for heating the soldering area. A plurality (13 according to the example of FIG. 2) of nozzles are arranged in a row on each of the burners 14, 15, 16, 17, 18 and 19 and three each of these burners are arranged in a row on the left or right and are affixed respectively to holding boards 20 and 21. The holding board 20 is attached to the side boards 22 and 23 on the burner 6 while the holding board 21 is attached to the side boards 24 and 25 on the burner 7. The angles of the nozzles can be adjusted within limits of an arc-shaped groove. While the burners 14, 15, 17 and 18 are connected directly to a gas mixing unit 32 so that they are ignited simultaneously, the burners 16 and 19 are connected to the gas mixing unit 32 respectively through valves 33 and 34 so that they operate in accordance with the size of the radiator W. Usually, furthermore, there are also pilot flames outside the width of the radiator W so as to heat the side surface of the soldering area. At one side of the nozzles 12 and 13, there are pilot flames 36 and 37 for either automatic or manual ignition which are derived after the valve 35 of the high pressure gas container. On the upper surfaces of the holding boards 20 and 21 and parallel to the nozzles, there are air pipes 26 and 27 for sending air to harden the solder on the jaw section W1. These air pipes 26 and 27 are so attached as to point their nozzles to the side surface of the tank W3. A bridge board 28 is also provided on the side boards 22 and 23 of the fixed burner table 6 and there are provided angle brackets 29 and 30 on the upper surface of the bridge board 28 so as to be adjustable in a transverse direction to the gap A. Air cylinders 38 and 39 are attached to their vertical surfaces so that the rollers 40 at the bottom ends of the piston rods will prevent the tank W3 from floating upward when compressed air is sent in.

Figure 6:
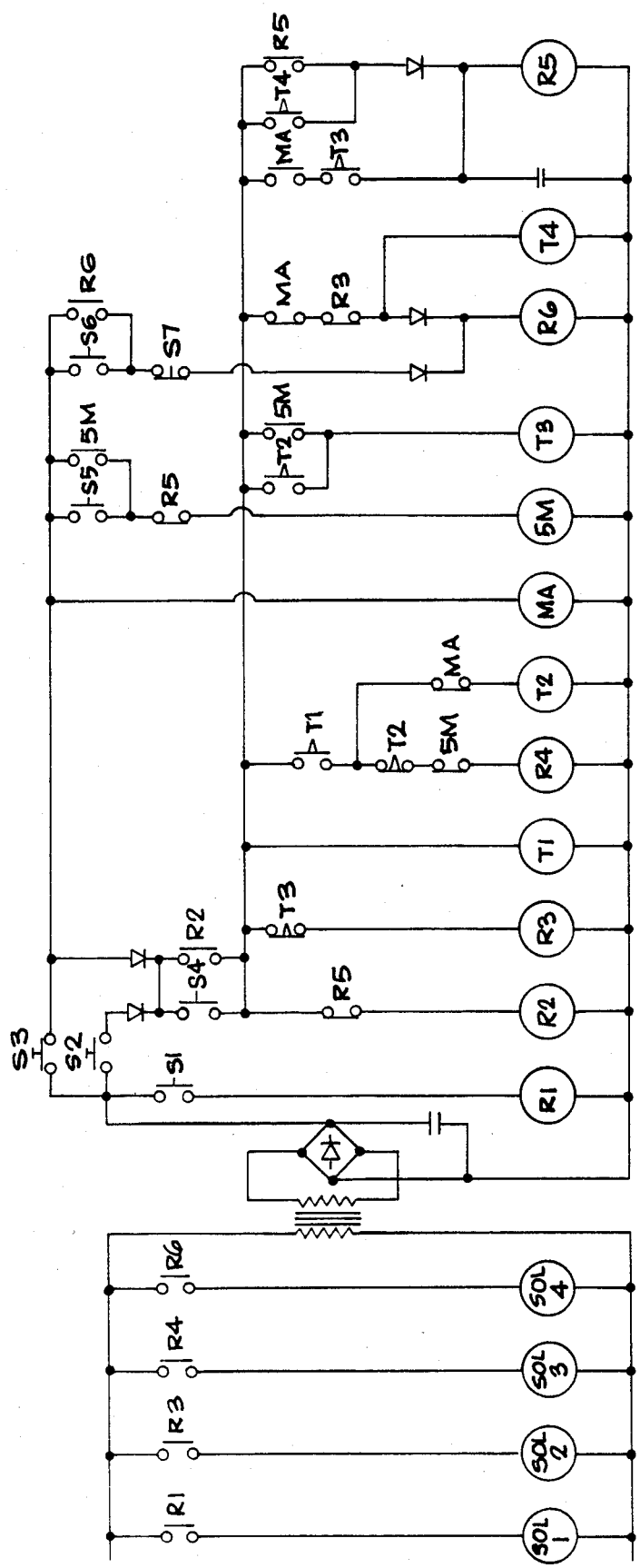
FIG. 6 is a control circuit diagram.

Next, the operation of the device of the present invention will be explained by means of FIG. 4 which shows its gas piping, FIG. 5 which shows its air piping and FIG. 6 which shows its control circuit. When the radiator W to be soldered is given, the screw 4 is caused to rotate by a handle and the height of the frame 3 is adjusted so that the jaw section W1 will fit with the cooling pipes 10 and 11. The handle 9 is loosened next and the burner table 7 is moved by rotating the screw 8 by a handle. When the width is so adjusted that the jaw section W1 of the radiator W fits between the cooling pipes 10 and 11, the handle 9 is tightened and the burner table 7 is fastened. After the radiator core plate W2 is inserted into the gap A with the tank W3 covering the jaw section W1, the button switch S1 is pressed to activate the relay R1 and the electromagnetic valve SOL1 is switched by closing the a-contact to send compressed air into the air cylinders 38 and 39. This causes the piston rods to move downward and the tank W3 is pressed down by the rollers 40 and is prevented from floating upward. Flux is applied on the soldering area by a brush both on the core plate on the upper surface of the jaw section W1 and the bottom edge of the tank W3. Solder is then placed therearound and water is circulated through the cooling pipes 10 and 11. For an automated operation of the device, the timer T1 for delaying the oxygen supply, the timer T2 for determining the time at which the jaw section W1 should reach an appropriate temperature for soldering, the timer T3 for quickly cutting off the oxygen supply at the time of burner fire extinction and the timer T4 for continuing to send air until the solder becomes hardened are set, for example, to 0.1–10 seconds, 0.5–60 seconds, 0.1–10 seconds and 0.5–60 seconds, respectively. After the preparations are completed, the ignition button S4 is pressed together with the button switch S2 for automatic operation. This activates the relay R2 to bring the circuit into a hold condition. The timer T1 is activated simultaneously therewith and the relay R3 is activated to close the a-contact of R3 and to open the electromagnetic valve SOL2 in the supply route from a high pressure gas (usually propane gas) container. This causes the gas to be sent to the gas mixing unit 32 and the nozzles 12 and 13 of the burner tables 14, 15, 17 and 18 are ignited by means of the pilot flames 36 and 37. In the meantime, the b-contact of the relay R3 is opened and this opens the circuit for the relay R6 to shut off the cooling air. When the a-contact of T1 is closed by the timer T1, the relay R4 is activated to close the a-contact of R4 and to open the electromagnetic valve SOL3 of the oxygen supplying circuit. This sends the oxygen from the high pressure oxygen container into the gas mixing unit 32 and a gas mixed with about 3–5 kg of high pressure oxygen is sent to the burners 14, 15, 17 and 18, and is then ignited at the nozzles 12 and 13, causing powerful flames to heat the jaw section W1 as well as the soldering area of the tank W3. This heat, however, is not transmitted to the radiator core W2 due to the working of the cooling pipes 10 and 11. When the temperature of the soldering area rises, the solder becomes melted and flows all over the core plate of the jaw section W1. Since the timer T2 is on when the a-contact of the timer T1 is closed, the b-contact of T2 opens after the set time elapses. The relay R4 becomes deactivated and since the a-contact of R4 opens, the electromagnetic valve SOL3 closes, shutting off the oxygen supply and reducing the fire intensity. Since the timer T3 is on when the a-contact of the timer T2 is closed, furthermore, the b-contact of T3 opens after the set time elapses. This deactivates the relay R3 and since the a-contact of R3 is opened and the electromagnetic valve SOL2 is closed, the gas supply is shut off and the fire is extinguished. Deactivation of the relay R3 closes the b-contact of R3 which has been open and the relay R6 is activated to close the a-contact of R6 and the electromagnetic valve SOL4 is opened. This causes air to stream out of the air pipes 26 and 27 and the solder becomes hardened. When the b-contact of the relay R3 closes, the timer T4 is activated and after the set time elapses the a-contact of T4 closes to activate the relay R5. This places the circuit in a hold condition and simultaneously opens the b-contact of R5 to shut off the power source by opening the circuit for the relay R2.

In the case of a manual operation, too, the button switch S3 is operated to prevent an explosion by beginning to supply oxygen only after the gas is ignited and by shutting it off only after the fire is extinguished and then shutting off the gas. In the case of a manual operation, the button switch S6 is used for sending in cooling air, S7 for shutting off air and S5 for extinguishing fire.

As described in detail above, both the supporting tables and the burner tables of the present invention are made adjustable in accordance with the size of the radiator. Since the entire soldering area is heated simultaneously by a large number of flames, the time required for soldering is significantly reduced so as to improve not only the work efficiency but also the quality of the result because the soldering area is uniformly heated. This, furthermore, eliminates any adverse effects on the soldered sections of the cooling pipes for the radiator core and also the probability of water leakage from other soldered sections. Moreover, since a control circuit has been introduced so as to delay the beginning of the oxygen supply at the time of ignition and to shut it off at an earlier time when the fire is extinguished, the sound of explosion can be reduced, eliminating fear and uneasiness of the workers.

This invention has been described above through only one embodiment but this is to be regarded as illustrative rather than as limiting and the disclosure above should accordingly be broadly construed. For example, the use of the device of this invention is not limited to the soldering of radiators. The number of nozzles on each burner and the number of burners on each side of the soldering area can be freely changed, depending on the circumstances. The mechanism for adjusting the height of the frames and the width of the gap can similarly be changed from those disclosed herein. The scope of the present invention is limited only by the following claims.

What is claimed is:

1. A soldering device for an object having a core section and an extended area, said device comprising
    a base,
    two frames whose vertical positions with respect to said base are adjustable,
    two burner tables forming therebetween a gap with an adjustable interval for inserting said object, said two burner tables being respectively on said two frames,
    cooling pipes for passing cooling water therethrough to prevent transmission of heat into said core section, said cooling pipes being disposed respectively on said burner tables, sandwiching said gap therebetween and being in contact with said soldering area of said object,
    a plurality of burner nozzles disposed on each of said burner tables, directed generally towards said gap and distributed perpendicularly to said interval and uniformly over a distance no less than the entire width of said extended soldering area, said plurality of burners being divided into several control units so that nozzles belonging to different units can be operated independently of each other,
    one or more valve means for controlling passage of fuel to one or more of said several units, and
    a control means for shifting the times for starting and shutting off the supplying of an oxygen-containing gas from the burner ignition and fire extinction times.

2. The device of claim 1 wherein said object is a radiator.

3. The device of claim 1 further comprising an auxiliary group of side burner nozzles for heating a surface not reachable by said plurality of burner nozzles disposed on said burner tables.

* * * * *